United States Patent [19]

Schmeisser et al.

[11] 4,071,128

[45] Jan. 31, 1978

[54] APPARATUS FOR SHIELDING MOVING PARTS IN FLUID-OPERATED MACHINES

[75] Inventors: Walter Schmeisser; Johann Talasz, both of Heidenheim, Germany

[73] Assignee: J. M. Voith GmbH, Heidenheim, Germany

[21] Appl. No.: 735,085

[22] Filed: Oct. 22, 1976

[30] Foreign Application Priority Data

Nov. 8, 1975 Germany .................. 2550204

[51] Int. Cl.² ................................ F16P 3/08
[52] U.S. Cl. ....................... 192/133; 425/151; 74/613; 60/484
[58] Field of Search ........... 425/151, 152; 192/133; 74/613; 100/53; 251/89; 60/484, 399

[56] References Cited

U.S. PATENT DOCUMENTS

| | | | |
|---|---|---|---|
| 2,050,619 | 8/1936 | Malott | 192/133 |
| 3,020,593 | 2/1962 | Olmsted et al. | 425/152 |
| 3,390,430 | 7/1968 | Lynch et al. | 425/151 |

Primary Examiner—Edgar W. Geoghegan
Attorney, Agent, or Firm—Peter K. Kontler

[57] ABSTRACT

A blow molding machine wherein a shield is movable to and from an operative position in which it prevents access to the mold sections. The hydraulic motors which move the mold sections can receive pressurized fluid only when the shield is locked in the operative position by a roller. When the roller is retracted from its arresting position, a mechanical power train automatically closes valves which are installed in conduits connecting the motors with oil pumps. The valve elements of the valves are mechanically coupled to each other and to the roller, and are biased by a spring which tends to maintain the roller in the arresting position. A single-acting hydraulic cylinder is employed to move the roller from the arresting position. The shield can be moved by hand and/or by a double-acting hydraulic cylinder.

16 Claims, 2 Drawing Figures

APPARATUS FOR SHIELDING MOVING PARTS IN FLUID-OPERATED MACHINES

BACKGROUND OF THE INVENTION

The present invention relates to safety devices in general, and more particularly to improvements in safety devices which can be used in fluid-operated machines, such as blow molding machines for the production of bottles or analogous hollow shaped articles. Still more particularly, the invention relates to improvements in means for controlling the movements of mobile screens, shrouds, shields or analogous devices which are used in or with various types of machines to shield the moving parts of such machines and to thereby protect the attendants whenever the fluid-operated motor or motors of the machines are in operation or ready for operation.

It is already known to provide a fluid-operated machine with a safety device which consists of or includes a mobile screen, shield or shroud (hereinafter referred to as shield for short) and which prevents access to moving parts of the machine whenever the means for transmitting motion to such parts is in operation or ready for operation. For example, if the means for moving certain parts of the machine comprises a hydraulic motor receiving pressurized fluid by way of a valve which is installed in a pressure line connecting a pump or another source of pressurized fluid with the motor, a connection between the motor and the source of pressurized fluid can be established only when the shield is held in the operative position, i.e., when the shield prevents access to the moving part or parts of the machine. Even partial shifting of the screen from its operative position entails automatic interruption of the operative connection between the source and the motor. Examples of machines which must be provided with such screens are blow molding machines which are used for the production of large containers (e.g., containers having a capacity of up to and in excess of 200 liters). The sections of the blow mold are movable between open and closed positions by hydraulic cylinder and piston units which generate very large forces, i.e., forces of a magnitude which suffices to cause serious injury to or death of a careless or unskilled attendant. It is often necessary to gain access to the cavities of the mold sections prior to introduction of a parison which is converted into a hollow shaped article, for example, in order to introduce threaded nipples or like inserts which are integrated into the material of the blow molded articles. In many instances, the inserts are introduced by hand so that the protective shield must be moved from its operative position before the mold sections are caused to close around a parison. The introduction of inserts is but one of many reasons that an attendant must gain access to the mold sections when the blow mold is open; for example, it is often necessary to inspect the mold sections and/or other components which are accessible only when the blow mold is open. Still further, a careless attendant is often tempted to assist the introduction of a parison into the space between the open sections of a blow mold, a practice which can lead to serious injury, maiming or death. Therefore, the provision of a protective shield which prevents access to (i.e., which shields) the moving parts of such machines is an absolute necessity which is enforced by authorities in many countries. The arrangement must be such that the fluid-operated motor or motors of the machine are automatically disconnected from the source or sources of pressurized fluid whenever the shield does not assume its operative position. It is further necessary to insure that the fluid-operated motor or motors cannot be actuated when the sections of a blow mold must be replaced or exchanged, i.e., when the attendant or attendants must enter or place their hands into the space between the platens for the mold sections.

In certain presently known machines of the above outlined character, the means for insuring that the shield is held in operative position when the motor or motors are ready for operation includes two limit switches. One of the limit switches completes the circuit of a solenoid-operated valve in the hydraulic connection between the motor or motors and the source of pressurized fluid when the shield assumes its operative position so that the valve admits or can admit fluid to the motor or motors. The other limit switch opens the circuit of the valve so that the valve closes as soon as the shield leaves its operative position. Such safety devices are not reliable because the limit switches establish or terminate a connection between the source of pressurized fluid and the motor or motors through the intermediary of a further part (such as the aforementioned solenoid-operated valve) which is likely to jam and to thereby allow pressurized fluid to reach the motor or motors when the shield is not held in the operative position. Moreover, a careless attendant is likely to intentionally deactivate the other limit switch so that the shield remains in open position while the valve is free to admit pressurized fluid to the motor or motors.

In accordance with another earlier proposal, the shield is provided with a trip (e.g., a wedge-like cam) which actuates a pilot valve as soon as the shield leaves its operative position. The pilot valve thereby causes a shutoff valve to seal the source of pressurized fluid from the motor or motors for the moving part or parts of the machine. As a rule, the shutoff valve has an annular seat for the valve element. Thus, even minor impurities which deposit on the seat and/or on the valve element can prevent complete closing of the shutoff valve so that the latter continues to admit pressurized fluid to the motor or motors after the shield leaves its operative position. Another drawback of such systems is that, if the shield is to actuate the pilot valve immediately after it leaves the operative position, the slope of the aforementioned wedgelike trip or cam must be very pronounced in order to make sure that a relatively minor displacement of the shield from the operative position invariably suffices to actuate the pilot valve and to result in immediate closing of the shutoff valve. Such actuation of the pilot valve by a steep trip or cam necessitates the exertion of a very pronounced force in order to move the shield from its operative position. This is tiresome of the attendants if the shield must be opened by hand because a relatively large force must be applied immediately after the shield is set in motion or simultaneously with initial stage of movement of the shield from its operative position. If the shield is moved by a motor or another suitable prime mover, the energy requirements of the prime mover are very high. The problem is especially acute when the shield must be moved back and forth at frequent intervals, e.g., after each opening of a blow mold.

OBJECTS AND SUMMARY OF THE INVENTION

An object of the invention is to provide a novel and improved apparatus which invariably prevents access to moving parts of fluid-operated machines when the motor or motors for such moving parts are running or are ready for operation, and which becomes operative in the event of malfunction of its components.

Another object of the invention is to provide an apparatus of the just outlined character which is constructed and assembled in such a way that it cannot be readily deactivated by a heedless, oblivious or careless attendant.

A further object of the invention is to provide a novel and improved apparatus which is particularly suited to prevent access to the mold sections and/or other moving parts of blow molding and like machines when the prime mover or prime movers for such moving parts are in operation or ready for operation.

An additional object of the invention is to provide an apparatus which can be installed in existing machines as a superior and more reliable substitute for presently known apparatus whose purpose is to protect the attendants against injury or death due to carelessness or lack of experience.

The invention is embodied in an apparatus for shielding the moving parts of machines wherein the moving parts receive motion from at least one fluid-operated motor which is connected with a source of pressurized fluid by at least one conduit. The apparatus comprises a shield which is reciprocable or otherwise movable to and from an operative position in which it prevents access to at least one moving part of the machine, means for locking the shield in the operative position including a bolt, a roller or an analogous blocking member movable to and from an arresting position in which the blocking member prevents any movement of the shield from the operative position, a valve which is installed in the conduit between the motor and the source and has a valve element movable between first and second positions in which the valve respectively seals the source from the motor and allows fluid to flow from the source to the motor, and means for mechanically coupling the blocking member with the valve element so as to invariably and positively move the valve element to the first position in automatic response to movement of the blocking member from the arresting position. Thus, the valve is closed as soon as the shield is free to leave its operative position and the valve remains closed until the shield returns to the operative position and the blocking member thereupon returns to the arresting position.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
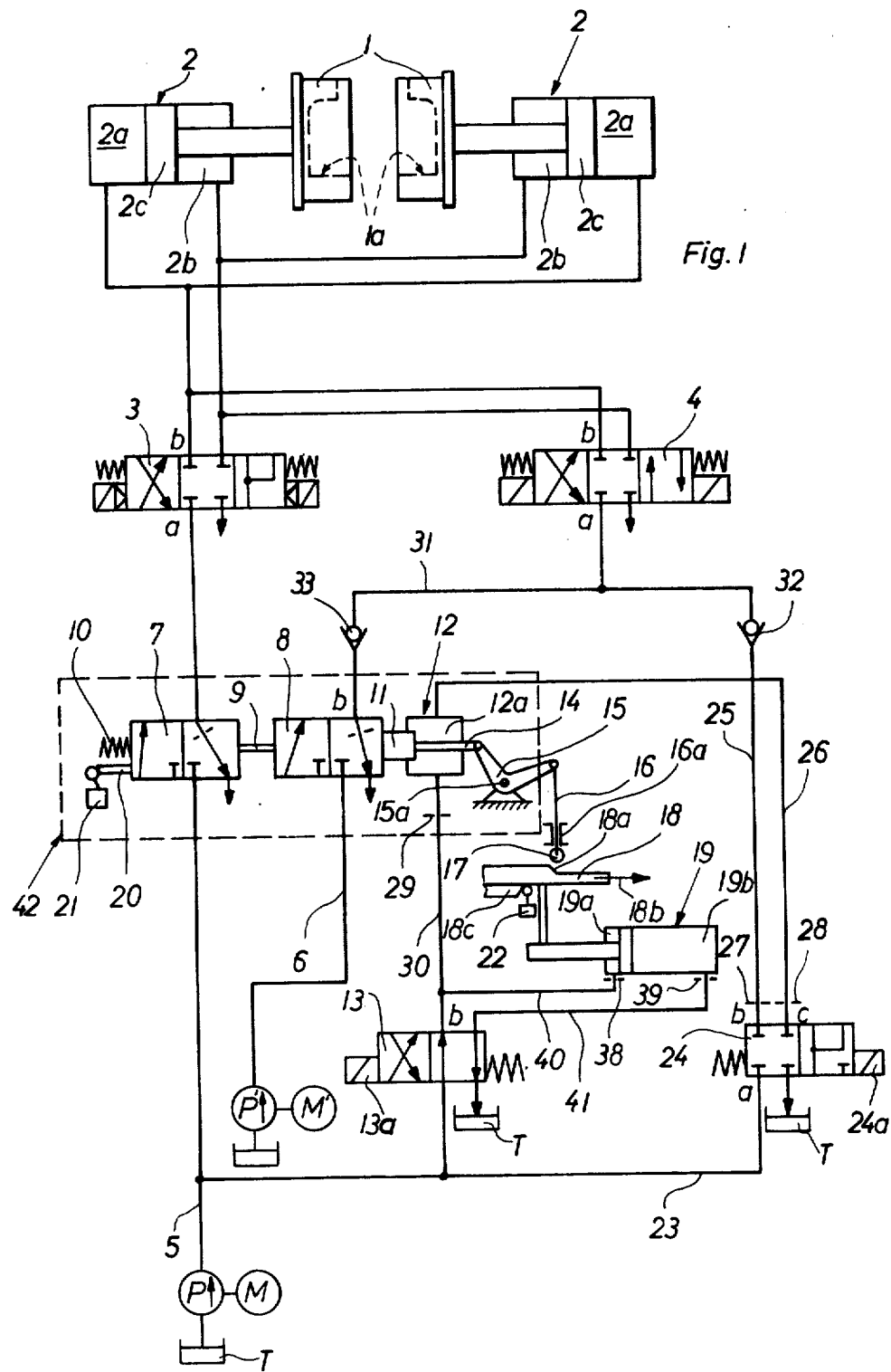
FIG. 1 is a diagrammatic view of a portion of a blow molding machine and of an apparatus which embodies the invention, the shield being shown in the operative position.

FIG. 1 shows a portion of a blow molding machine having two mold sections (moving parts) 1 with recesses 1a which define a mold cavity when the sections are moved from the illustrated (open) positions to the closed positions. The space between the sections 1 receives a parison before the blow mold is closed by two horizontal fluid-operated motors 2 each of which constitutes a double-acting hydraulic cylinder and piston unit. The admission of pressurized fluid into and the evacuation of fluid from the chambers 2a, 2b, of the motors 2 is regulated by two multi-way main valves 3 and 4. The valve 3 can receive pressurized fluid (preferably oil) by way of a main supply conduit 5 which is connected to the outlet of a pump P or an analogous source of pressurized fluid. The pump P is driven by an electric motor M. The port b of the main valve 3 admits large quantities of fluid at a relatively low pressure (e.g., 50 bars) into the chambers 2a to effect rapid advance of pistons 2c in directions to close the blow mold. A second main supply conduit 6 is connected with a pump P' (driven by an electric motor M') and serves to deliver relatively small quantities of a highly pressurized fluid (e.g., at a pressure in the range of 250 bars) to the port a of the main valve 4 when the port b of this valve communicates with the chambers 2a. Such highly pressurized fluid is used to apply the locking or closing pressure during expansion of a parison (not shown) in the mold cavity.

The ports a of the main valves 3, 4 respectively receive pressurized fluid by way of pilot valves 7 and 8 having valve elements (not specifically shown) which are mechanically coupled to each other by a rod 9 or analogous connecting means. The valve elements are biased in a direction to the right, as viewed in FIG. 1, by a helical valve spring 10 which is associated with the left-hand pilot valve 7. When the spring 10 is free to dissipate energy, the valve elements (e.g., pistons or plungers) of the pilot valves 7 and 8 are held in their operative positions in which the pumps P and P' respectively supply pressurized fluid to the ports a of the main valves 3 and 4.

The valve element of the right-hand pilot valve 8 constitutes or is rigid with the piston 11 of a prime mover here shown as a single-acting hydraulic cylinder 12 having a chamber 12a which can receive pressurized fluid by way of a first auxiliary solenoid-operated valve 13 or by way of a second auxiliary solenoid-operated valve 24. The valve 13 receives pressurized fluid from a branch 23 of the conduit 5; the branch 23 is further connected with the port a of the second auxiliary valve 24. As a rule, the chamber 12a receives pressurized fluid from and discharges fluid by way of the valve 13.

The piston 11 has a rod-like extension 14 which is articulately connected with one arm of a bell crank lever 15 fulcrumed at 15a and having a second arm articulately connected with a rod 16 which is guided in a suitable bearing sleeve 16a and carries a blocking roller 17 adapted to enter the space in front of a shoulder 18a forming part of a shield 18 for the mold sections 1. The manner in which the shield 18 prevents access to the sections 1 is the same or analogous to the manner of installing such shield in conventional blow molding machines. The blocking roller 17 constitutes an arresting device for the shield 18, i.e., it can lock the shield 18 in the operative position of FIG. 1. The direction in which the shield 18 must be moved, either by hand or by a prime mover, in order to leave the operative position of FIG. 1 is indicated by arrow 18b.

FIG. 1 shows the blocking roller 17 in its retracted position in which the pilot valves 7, 8 seal the main valves 3, 4 (and hence the motors 2) from the respective pumps P and P'. In other words, the shield 18 can be moved from its operative position. It is preferred to assemble the pilot valves 7, 8, the motor 11–12 and the lever 15 into a self-supporting unitary structure 42 (indicated by broken lines). Furthermore, the valves 3, 4, 7, 8 can be installed in a single housing or block so as to eliminate long and large-diameter conduits for the flow of fluid to and from the motors 2.

The blocking roller 17 is held in the retracted position of FIG. 1 because the auxiliary valve 13 permits pressurized fluid to flow from the branch conduit 23 of main supply conduit 5 into the chamber 12a so that the fluid maintains the piston 11 in the left-hand end position whereby the spring 10 stores additional energy. The pilot valves 7 and 8 are closed because their valve elements (together with the piston 11 and rod 9) are held in the left-hand end positions. When the solenoid 13a of the auxiliary valve 13 is energized, the chamber 12a communicates with the sump T and the spring 10 is free to open the pilot valves 7 and 8. At the same time, the spring 10 causes the roller 17 to block the movement of the shield 18 from the operative position of FIG. 1. The parts 11, 14–16 constitute a simple but highly reliable means for mechanically coupling the blocking roller 17 with the valve elements of the pilot valves 7 and 8.

The prime mover means for moving the shield 18 between operative and inoperative positions comprises an additional fluid-operated motor (hereinafter called servomotor) 19 which receives pressurized fluid and discharges fluid by way of the auxiliary valve 13. The servomotor 19 is a double-acting cylinder and piston unit.

The rod 9 or the valve element of the pilot valve 7 has an extension or trip 20 which can actuate a first limit switch 21. The switch 21 is closed when the valve spring 10 stores energy, i.e., when the valves 7 and 8 seal the ports a of the main valves 3 and 4 from the pumps P and P'. A second limit switch 22 is adjacent to the path of movement of an actuating element or trip 18c which is rigidly connected to or moves in synchronism with the shield 18. The arrangement is such that the trip 18c opens the limit switch 22 as soon as the shield 18 leaves the operative position of FIG. 1 (by moving in the direction indicated by arrow 18b). When the switch 21 opens simultaneously with the switch 22, the motors M and M' are automatically disconnected from the respective energy sources (or from a common energy source). In other words, the pumps P and P' are arrested whenever the shield 18 leaves the operative position and the trip 20 maintains the switch 21 in open position. The manner in which the limit switches 21, 22 are connected in circuit with the motors M and M' is well known and need not be shown here. These limit switches constitute a safety device which prevents fluid from flowing to the main valves 3 and 4 independently of the pilot valves 7 and 8. This safety device becomes effective in the event of damage to the blocking roller 17 and/or to mechanical coupling means 11, 14, 15, 16, i.e., when the blocking member 17 can be retracted while the valve elements of pilot valves 7 and 8 permit fluid to flow from the pumps P and P' to the valves 3 and 4.

The port b of the auxiliary valve 24 is connected with the port a of the main valve 4 by a conduit 25. A further conduit 26 connects the port c of the valve 24 with the chamber 12a of the motor 12, i.e., the piston 11 can be shifted in a direction to the left, as viewed in FIG. 1, in response to admission of pressurized fluid via conduit 30 (port b of the valve 13) or via conduit 26.

The conduits 25 and 26 contain flow restrictors 27 and 28. The flow restrictor 27 reduces or restricts the rate of fluid flow to the motors 2 (via valve 4) in such a way that the closing action of motors 2 is relatively slow (e.g., less than one meter per minute). The flow restrictor 28 (and an analogous flow restrictor 29 in the conduit 30) insures that the impulse induced by connecting the conduit 23 with the conduit 26 or 30 is soothed. The conduit 31 which connects the port b of the pilot valve 8 with the port a of the main valve 4 contains a ball check valve 33. A similar check valve 32 is installed in the conduit 25 between the outlet port b of the auxiliary valve 24 and the port a of the valve 4.

The solenoid 24a of the valve 24 is preferably energizable only by hand, namely by resorting to a special key (not shown) which is available to a trusted employee. The energization of solenoid 24a results in establishment of an operative connection between the pump P and the main valve 4 (i.e., the pilot valve 8 is then by-passed) and in retraction of the blocking roller 17 to the position shown in FIG. 1 (because the chamber 12a then receives pressurized fluid via conduit 26). The flow restrictor 27 insures that, when the conduit 25 communicates with the branch conduit 23, the rate of fluid flow to the motors 2 is a fraction of the rate of flow when the motors 2 receive pressurized fluid from the pump P' via conduit 6 and pilot valve 8.

The auxiliary valve 24 is desirable and advantageous because it allows for movements of the mold sections 1 and for opening or closing of the shield 18 independently of the positions of pilot valves 7 and 8. Such mode of operation will be necessary or desirable when the attendants must change the setup of the blow molding machine, e.g., by replacing the sections 1 with different sections. The operator then opens the valve 24 by hand, i.e., by using the aforementioned key, not shown, which energizes the solenoid 24a to move the valve element of the valve 24 in a direction to the left, as viewed in FIG. 1, and to thereby establish communication between the conduit 23 and the conduits 25, 26. The motors 2 are then operated in response to suitable manipulation of the main valve 4 which can admit pressurized fluid into the chambers 2a or 2b and can also permit evacuation of fluid from these chambers. As a rule, the actuation of auxiliary valve 24 for the purpose of moving the sections 1 or their platens while the shield 18 is held in the open (inoperative) position will be entrusted to a highly skilled and reliable employee, i.e., to the person who has access to the special key. As mentioned above, the flow restrictor 27 insures that the rate of flow of pressurized fluid to the main valve 4 via conduits 23, 25 is only a fraction of the rate of fluid flow to the valve 4 when the pilot valve 8 is open. This insures that the movements of mold sections 1 or their platens are very slow so that the likelihood of injury to a person servicing the blow molding machine while the shield 18 is held in the inoperative position is very remote. Safety of the attendant who is in charge of servicing the moving parts of the machine, while the shield 18 is open, is practically assured if the maximum speed of movement of the piston 2c in response to admission of pressurized fluid to the motors 2 via conduits 23, 25 is less than 1 meter per minute. The pilot valves 7, 8 remain closed whenever the valve 24 admits fluid to the conduits 25, 26 because the blocking roller 17 is retracted and the mechanical coupling means 11, 14–16 maintains the valve elements of the valves 7 and 8 in the first or sealing positions.

If the attendant forgets to remove the special key after the change in setup of the blow molding machine is completed, the pilot valves 7 and 8 remain closed (irrespective of the position of the shield 18) because the spring 10 is free to move the blocking roller 17 to the arresting position only when the pressure in the chamber 12a is reduced sufficiently to allow the spring 10 to expand, i.e., when the valve 13 establishes communication between the chamber 12a and the sump T (via conduit 30). The pressure in the chamber 12a cannot be reduced sufficiently to allow the spring 10 to expand if the valve 24 is open, i.e., if the conduit 26 admits pressurized fluid to the cylinder 12.

Figure 2:
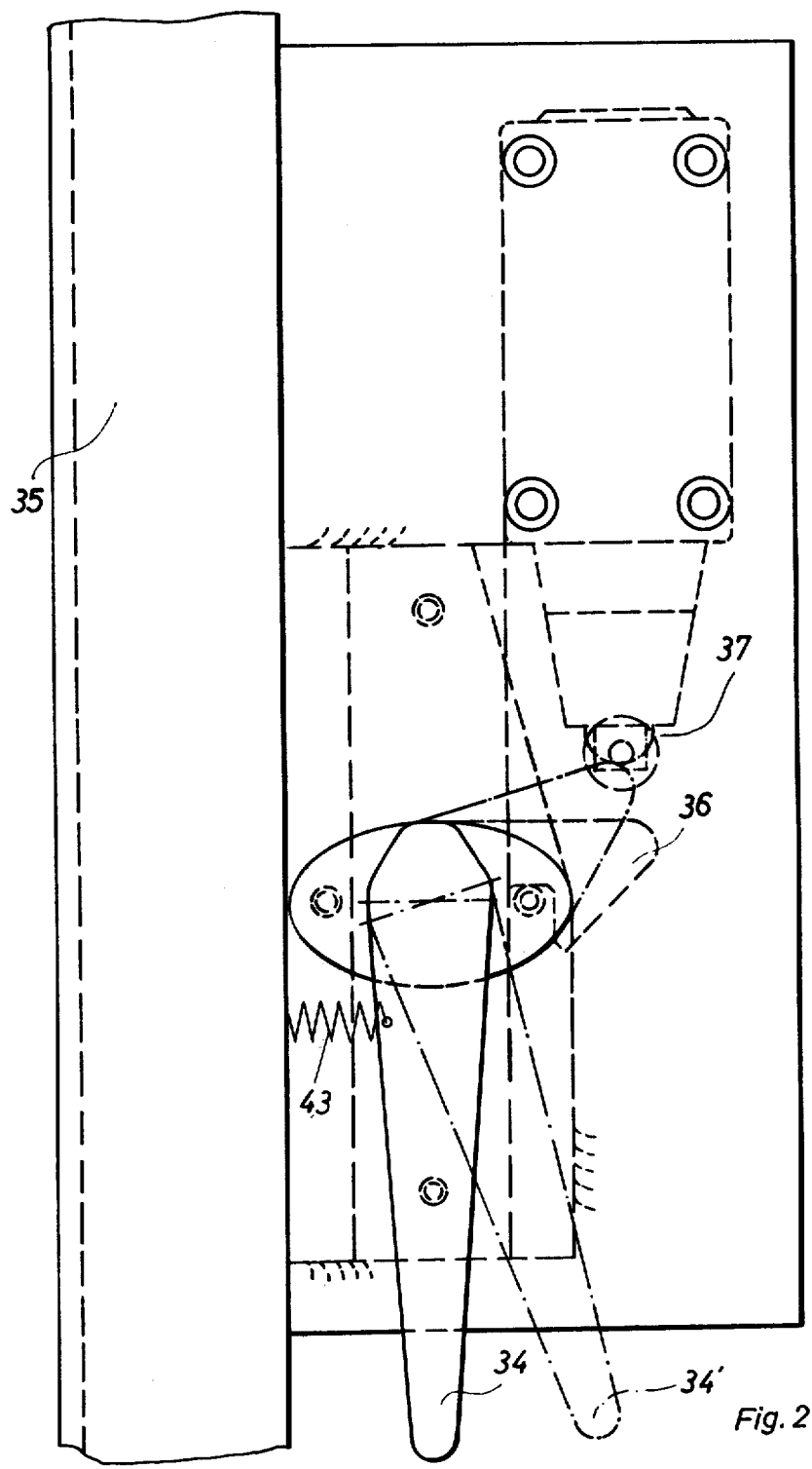
FIG. 2 is an enlarged view of a portion of the shield and of manually operable handgrip means for moving the shield to the inoperative position.

FIG. 2 shows a handgrip means 34 (e.g., a pivotable lever) which can be manipulated by hand in order to move the shield 18 from the operative position. The lever 34 can be provided together with or as a substitute for the servomotor 19. As shown in FIG. 2, the lever 34 can be pivoted by hand and is secured to a frame 35 of the shield 18. The frame 35 must be moved in a direction to the right, as viewed in FIG. 2, in order to allow for movement of the shield 18 from the operative position. Prior to opening of the shield 18, the lever 34 is pivoted counterclockwise, as viewed in FIG. 2, to assume the phantom-line position 34'. Such pivotal movement of the lever 34 is shared by a second lever 36 which thereby actuates an electric switch 37 to deenergize the solenoid 13a of the auxiliary valve 13, i.e., the valve element of the valve 13 assumes the position of FIG. 1 and connects the branch conduit 23 with the chamber 12a to open the pilot valves 7 and 8. The pumps P and P' are sealed from the main valves 3 and 4, and the blocking roller 17 is withdrawn from the path of movement of the shield 18 in the direction of arrow 18b. The shield 18 is thereupon moved to inoperative position by the handle 34 and/or by the servomotor 19. The flow restrictors 38, 39 in the conduits 40, 41 which connect the valve 13 with the chambers 19a, 19b of the servomotor 19 insure that the movement of the shield 18 to or from the operative position takes place at a predetermined speed.

The lever 34 is preferably biased by a spring 43 which maintains it in the solid-line position of FIG. 2 in which the valve 13 connects the conduit 23 with the chamber 19b and the chambers 19a, 12a communicate with the sump T via conduits 40, 30. Thus, when the operator decides to move the lever 34 from the solid-line position to the position 34', the prime mover including the piston 11 automatically retracts the blocking roller 17 from the arresting position and the shield 18 is then free to move from the operative position by pushing the lever 34 in a direction to the right, as viewed in FIG. 2. In other words, opening of the shield 18 by way of the handle is automatically preceded by retraction of the roller 17, i.e., by movement of valve elements in the pilot valves 7 and 8 to the sealing positions. An advantage of the lever 34 is that it causes retraction of the blocking roller 17 before the shield 18 moves from the operative position of FIG. 1. This insures that the shield can be moved in response to exertion of a relatively small force because the shield need not bear against the roller 17 in order to shift the latter from the arresting position (in which the roller 17 is located in the path of movement of the shoulder 18a).

The servomotor 19 is desirable and advantageous when the shield 18 must be moved at frequent intervals, e.g., in response to or subsequent to each opening of the mold including the sections 1 so that an attendant can introduce threaded nipples or other inserts before the mold closes again. The auxiliary valve 13 then admits pressurized fluid into the chamber 19a and connects the chamber 19b with the sump T whenever the lever 34 is pivoted to the position 34'. The flow restrictor 38 determines the speed at which the servomotor 19 moves the shield 18 to the inoperative position. The servomotor 19 can begin to move the shield 18 back to the operative position when the spring 43 is free to return the lever 34 to the solid-line position of FIG. 2. The speed of movement of the shield 18 to the operative position is determined by the flow restrictor 39.

An important advantage of the improved apparatus is that the blocking roller 17 is mechanically coupled to the valve elements of the pilot valves 7 and 8. Thus, when the roller 17 is moved from the arresting position to the retracted position of FIG. 1, the valve elements of the pilot valves 7 and 8 automatically and invariably seal the pumps P and P' from the main valves 3, 4 and hence from the motors 2 for the mold sections 1. This insures that the mold sections 1 cannot move as long as the blocking roller 17 remains in the retracted position. FIG. 1 shows that the roller 17 can assume its arresting position only when the shield 18 is closed, i.e., the pilot valves 7, 8 allow pressurized fluid to flow from the pumps P and P' only when the shield 18 assumes its operative position and is also arrested or locked in such position.

Another feature of the improved apparatus is that the motor 12 can be used to move the roller 17 to retracted position simultaneously with movement of the valve elements of pilot valves 7 and 8 from the sealing positions shown in FIG. 1.

The apparatus of our invention insures that malfunctioning of the valves 3, 4, 13 cannot affect the safety of attendants, i.e., even a minor displacement of the shield 18 from its operative position must be preceded by a movement of the blocking roller 17 to retracted position whereby the motors 2 are automatically sealed from the pumps P and P' and remain sealed as long as the roller 17 remains in the retracted position. The mechanical connection or coupling 16, 15, 14, 11, 9 between the roller 17 and the valve elements of pilot valves 7 and 8 is simple, reliable and practically foolproof so that the apparatus of the present invention meets all, even the most stringent, safety regulations for protection of persons against injury, maiming or death in plants wherein movements of one or more parts necessitate the application of pronounced forces which are furnished by one or more fluid-operated motors.

The provision of spring 10 or analogous biasing means constitutes a further desirable safety feature. This spring tends to maintain the valve elements of the pilot valves 7 and 8 in the open positions, i.e., it tends to push the piston 11 deeper into the chamber 12a of the motor 12. Consequently, the piston 11 tends to maintain the blocking roller 17 in the arresting position. In the event of failure of the auxiliary valve 13, the pressure of fluid in the chamber 12a equals atmospheric pressure and the spring 10 is free to expand, i.e., the roller 17 remains in the arresting position and the shield 18 is locked in the operative position. If the hydraulic system of the blow molding machine is out of commission, the spring 10 is free to expand and, therefore, the shield 18 prevents access to the mold sections 1. If the pressure of fluid in the conduit 5 and/or 6 thereupon abruptly rises to normal operating pressure, this does not represent any danger to attendants because the shield 18 remains in the operative position.

The improved apparatus is susceptible of many further modifications without departing from the spirit of the invention. For example, the blocking roller 17 can be replaced with a bolt which can enter a recess of the shield 18 when the latter assumes the operative position of FIG. 1. Also, the locking means may include two or more blocking members and the illustrated mechanical coupling means between the valve elements of the pilot valves 7, 8 and the blocking member or members can be replaced with other types of mechanical coupling means.

The apparatus of the present invention can be used with equal advantage in machines wherein a single motor or two or more motors receive pressurized fluid by way of a single supply conduit. In other words, the improved apparatus can be used with equal advantage in a machine wherein a single motor (e.g., one of the motors 2 shown in FIG. 1) is connected to a source of pressurized fluid by a single conduit which contains a pilot valve (e.g., the pilot valve 7) and, if necessary, a main valve. The blocking member of the locking or arresting means for the shield is then mechanically connected only with the valve element of the valve 7.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. Apparatus for shielding the moving parts of machines wherein the moving parts receive motion from at least one fluid-operated motor which is connected with a source of fluid by at least one conduit, comprising a shield which is movable to and from an operative position; means for locking said shield in said operative position, including a blocking member movable to and from an arresting position in which said locking means maintains said shield in said operative position; a valve installed in said conduit and having a valve element movable between first and second positions in which said valve respectively seals said source from said motor and allows fluid to flow therethrough; and means for mechanically coupling said valve element with said blocking member so as to move said valve element to said first position in response to movement of said blocking member from said arresting position.

2. Apparatus as defined in claim 1, further comprising means for moving said blocking member from said arresting position and for simultaneously moving said valve element to said first position through the medium of said coupling means.

3. Apparatus as defined in claim 2, further comprising means for biasing said blocking member to said arresting position.

4. Apparatus as defined in claim 3, wherein said moving means comprises a fluid-operated cylinder and piston unit whose piston forms part of said coupling means, said biasing means being arranged to urge said piston in a direction to move said blocking member to said arresting position.

5. Apparatus as defined in claim 4, further comprising auxiliary valve means actuatable to admit pressurized fluid to said cylinder against the opposition of said biasing means to thereby move said blocking member from said arresting position or to permit evacuation of fluid from said cylinder.

6. Apparatus as defined in claim 5, further comprising handgrip means provided on said shield and movable by hand from a first to a second position prior to movement of said shield from said operative position through the medium of said handgrip means, and means for actuating said auxiliary valve means so as to admit pressurized fluid into said cylinder in response to movement of said handgrip means to said second position.

7. Apparatus as defined in claim 6, further comprising means for biasing said handgrip means to said first position.

8. Apparatus as defined in claim 5, further comprising means for moving said shield to and from said operative position while said blocking member is out of said arresting position.

9. Apparatus as defined in claim 8, wherein said last mentioned moving means comprises a fluid-operated motor which receives fluid and from which fluid is discharged by way of said auxiliary valve means.

10. Apparatus as defined in claim 1, further comprising a safety device for preventing the flow of pressurized fluid from said source to said motor independently of said valve in response to movement of said shield from the operative position while said valve element assumes said second position.

11. Apparatus as defined in claim 10, wherein said source comprises a pump and electric drive means for said pump, said safety device comprising a first electric switch in circuit with said drive means and actuated by said valve element in the second position of said valve element, and a second electric switch in circuit with said drive means and actuated by said shield when said shield leaves said operative position, sumultaneous actuation of said switches resulting in deactivation of said drive means.

12. Apparatus as defined in claim 1, further comprising a second conduit connecting said motor with said source and a second valve installed in said second conduit and actuatable by hand to admit fluid from said source to said motor independently of said first mentioned valve.

13. Apparatus as defined in claim 12, further comprising a second fluid-operated motor for moving said blocking member from said arresting position in response to actuation of said second valve.

14. Apparatus as defined in claim 13, further comprising means for restricting the rate of fluid flow in said second conduit downstream of said second valve to a fraction of the rate of fluid flow in said first mentioned conduit downstream of said first mentioned valve in the open positions of the respective valves.

15. Apparatus as defined in claim 1, wherein said moving parts further receive motion from a second fluid-operated motor and said second motor receives pressurized fluid by way of a second conduit, and further comprising a second valve installed in said second conduit and having a second valve element movable between first and second positions in which said second element respectively seals said second conduit and permits said second motor to receive fluid by way of said second conduit, and means for mechanically coupling said valve elements so that the movement of one of said elements to said first or second position thereof entails the movement of the other element to first or second position and vice versa.

16. Apparatus as defined in claim 15, further comprising multi-way valves installed in said conduits between said first mentioned valves and said motors.

* * * * *